May 10, 1966 A. V. ALEXEFF 3,250,248
POST DIP COATING APPARATUS
Filed March 20, 1962 3 Sheets-Sheet 1

INVENTOR.
ALEXANDER V. ALEXEFF
BY Ely, Pearne & Gordon
Attorneys

INVENTOR.
ALEXANDER V. ALEXEFF
BY Ely, Pearne & Gordon
Attorneys

United States Patent Office 3,250,248
Patented May 10, 1966

3,250,248
POST DIP COATING APPARATUS
Alexander V. Alexeff, Cleveland, Ohio, assignor to Industrial Ovens, Incorporated, Cleveland, Ohio, a corporation of Ohio
Filed Mar. 20, 1962, Ser. No. 180,983
6 Claims. (Cl. 118—600)

This invention relates to coating apparatus. More particularly this invention relates to a dip tank for applying a coating of a readily vaporizable liquid to rapidly traveling webs and strands. For purposes of this application "strands" is to be understood to include monofilaments such as nylon, rayon, and glass fiber as well as wires, cords, narrow tapes, and tubings.

Although not limited thereto, the invention is particularly applicable to apparatus for dip coating a traveling web impregnated with synthetic rubber.

During the manufacture of pneumatic tires, several plies of rubber-coated fabric are bonded together to constitute the "carcass" of the tire. Because of the adhesive nature of natural rubber, individual plies of natural rubber impregnated fabric will tend to adhere to one another upon application of heat and pressure. Synthetic rubber does not possess this physical characteristic and it is necessary to apply a thin layer of natural rubber cement to the synthetic rubber impregnated plies prior to the laminating operation. To this end, solutions of natural rubber cement in volatile organic solvents, such as a mixture of 95 percent hi-octane gasoline and 5 percent rubber cement, are commonly employed.

Heretofore, dip tanks were utilized having a submerged roll or rolls and were substantially closed. Since the fabric entered the dip tank from the calendar rolls at a temperature of about 160 degrees F., the liquid in the tank approached that temperature and would readily vaporize. To prevent the accumulation of highly volatile fumes within the dip tank enclosure, the enclosure was exhausted at a very high rate during operation of the unit. Sweeping away the vapor from the surface of the liquid, however, merely induced more vaporization and loss of coating liquid. Furthermore, the surface turbulence created by the fabric leaving the tank created a larger surface area and also promoted vaporization.

The dip tank according to the present invention reduces the amount of volatile vapors that must be exhausted from the system by decreasing the surface area of the coating liquid presented to the atmosphere and by cooling at least the surface portion of the coating liquid. The present invention, therefore, has for its principal object the provision of a dip tank that will reduce the amount of vaporization of the coating liquid contained therein and overcome the disadvantages discussed above.

It is a further object to provide a dip tank that may be quickly and conveniently installed in existing processing lines.

It is a still further object of this invention to provide a dip tank that may easily be removed from a processing line for cleaning and replacement.

These and other objects of the invention will become apparent from the following description and the accompanying drawings.

Figure 1:
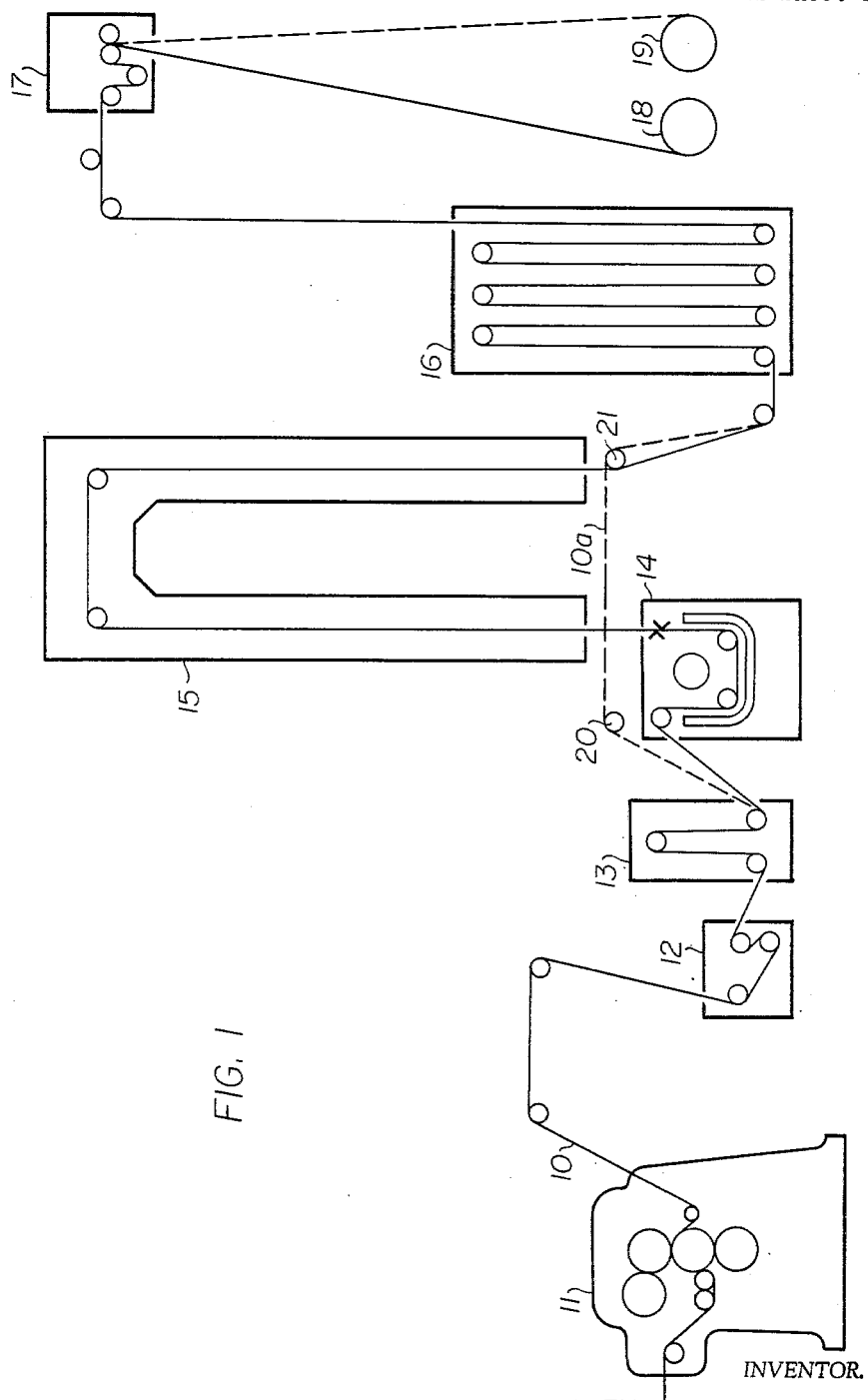
FIGURE 1 is a schematic illustration of a tire fabric processing line having a dip tank unit positioned therein according to one aspect of this invention.

Referring now to FIGURE 1, a continuous installation is shown in which the invention may be employed. In the illustration the web is indicated by the reference numeral 10. The main components of the installation shown in FIGURE 1 comprises a calendar stand 11, a post-calendar pull roll stand 12, a tension compensator 13, a dip tank 14, a drying oven 15, an accumulator stand 16, a pull out roll stand 17, and a pair of alternate windup stands 18 and 19.

The web 10 in the illustrated embodiment comprises rubber impregnated tire fabric. The impregnated fabric is pulled through the calendar 11 by the pull roll stand 12 and is maintained under constant tension by the tension compensator 13. If the tire fabric web has been coated with synthetic rubber it is led into the dip tank 14 to be coated with natural rubber. The dip tank may be bypassed, in the event that the web has been initially coated or impregnated with natural rubber and the post coating step is unnecessary, by directing a natural rubber impregnated web 10a over a dip tank bypass roll 20. It is to be noted that, in the event the web has been coated or impregnated with natural rubber and the dip tank is bypassed, the drying oven 15 is also bypassed and the web 10a is led directly from the roll 20 to the roll 21.

For continuous operation, an accumulator 16 is provided which permits the operator to change to an alternate windup stand without stopping the travel of the web.

Figure 2:
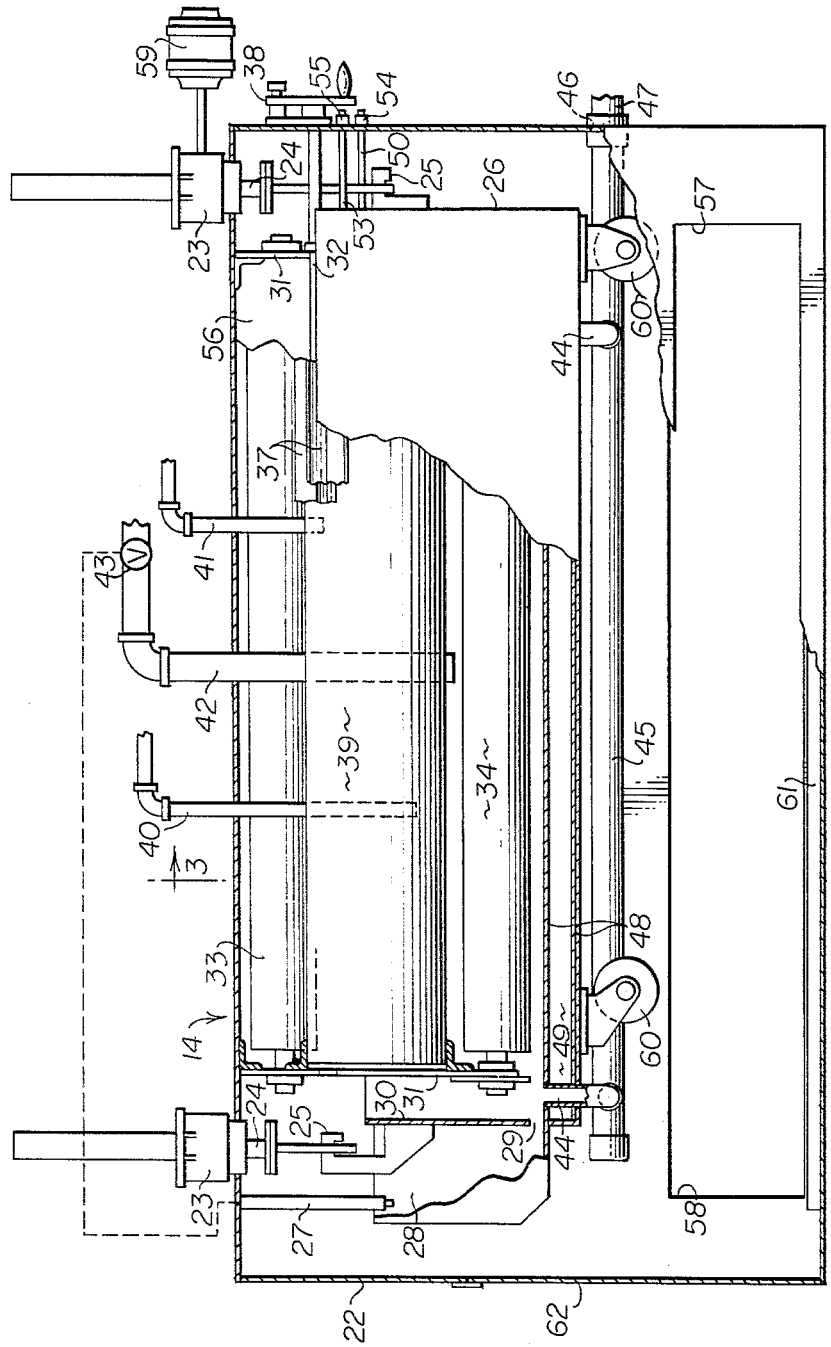
FIGURE 2 is an elevation, partly broken away for clarity, of a dip tank embodying the present invention.
Figure 3:
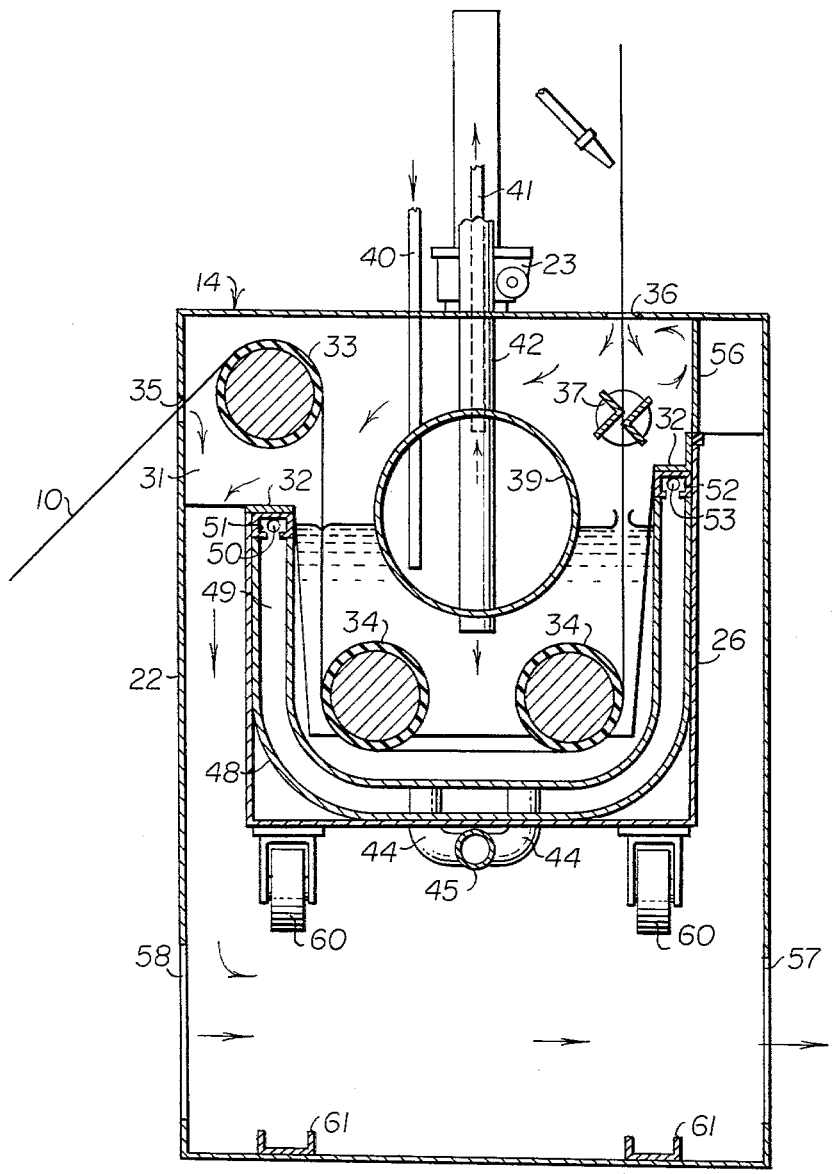
FIGURE 3 is a vertical section of the dip tank of FIGURE 2, the plane of the section being indicated by the line 3—3 of FIGURE 2.

Referring now to FIGURES 2 and 3, a dip tank 14 is illustrated which embodies the present invention. A substantially completely enclosed housing 22 is provided. A pair of pneumatically operated jacks 23 are mounted over and extend into the housing 22. A ram 24 extends from each jack 23 and engages, at its lower end portion, a pair of lift hooks 25 mounted on either end of a container 26.

The container 26 is adapted to be filled with a suitable coating liquid such as the particular mixture previously set forth. The level of the coating liquid is maintained at a predetermined constant elevation by a liquid level control device 27. The control device 27 is mounted over and extends through the housing 22 and into a chamber 28. The chamber 28 communicates with the container 26 at its lower end through a port 29 and is separated from the surface portion of the liquid in the container 26 by a wall 30. Thus, any turbulence present on the surface of the liquid in the container 26 will not affect the operation of the level control device 27.

A pair of support plates 31 are welded to the top wall and side walls of the housing 22. The lower portions of the support plates 31 are reduced and extend into the container 26. Neoprene cushions 32 are affixed to the upper lips of the container in the regions where the container 26 abuts the support plates 31. A lead-in roll 33 is journalled for rotation between the support plates 31 and is mounted in graphite bearings which are secured to each support plate 31. A pair of immersion rolls 34 are similarly journalled in graphite bearings at the lower ends of the support plates 31 and extend therebetween. The lead-in roll and the immersion rolls are coated with "Teflon" to protect them against the possible corrosive nature of the particular coating liquid employed.

The web 10 enters the dip tank through an inlet slot 35 and passes over the lead-in roll 33 and under the immersion rolls 34. The web 10 passes out of the dip tank through an outlet slot 36 located in the top of the housing 22.

A fabric angle wiper 37 is located above the container 26 and below the outlet slot 36 and extends between the support plates 31. As may be more clearly seen in FIGURE 3, the web 10 passes through and is wiped by the fabric blades of the wiper as it leaves the tank. The wiper blade pressure is adjusted by a vernier gauge 38 located on a side wall of the housing 22.

A hollow water-cooled condensing tank 39 extends transversely between the support plates 31 and serves, not only to condense vapor that rises from the surface portion of the coating liquid, but also to cool the surface portion of the coating liquid to reduce vaporization. The condensing tank 39 and the support plates 31, furthermore, serve to limit and confine the surface area of the coating liquid in the regions where the web enters and leaves the liquid. It is particularly important to confine the liquid in the region where the web leaves the bath since the rapidly traveling web will break the surface upwardly and cause undesirable turbulence. By confining and limiting the surface area of the liquid in this region, the turbulence is minimized and the escape of vapor is thereby reduced.

A suitable cooling liquid, such as water, is introduced into the condensing tank 39 through a coolant inlet pipe 40 and is withdrawn from the tank 39 through a coolant outlet pipe 41. The pipes 40 and 41 extend through the top wall of the housing 22 and are welded thereto to provide rigidity to the top wall of the housing 22.

Coating liquid is introduced into the container 26 through a coating liquid inlet pipe 42 which extends through the top wall of the housing 22 and through the condensing tank 39. The pipe 42 is welded to the top wall of the housing and to the condensing tank 39 to provide rigidity to these elements. The flow of coating liquid through the pipe 42 and into the container 26 is controlled by a valve 43 which is responsive to the liquid level control device 27, as is shown schematically in FIGURE 2. Thus if the liquid level control device 27 detects a drop in the liquid level of container 26, the valve 43 will respond to this drop and admit more liquid through the pipe 42.

In the event that it is desired to drain the coating liquid from the container 26, drain pipes 44 are provided in the bottom of the container 26, which communicate with a main drain tube 45. The drain tube 45 is releasably secured to an outlet port 46 in the end wall of the housing 22. An outlet pipe 47 leads from the outlet port 46 and is normally closed by a threaded cap (not shown).

The container 26 is provided with a pair of inner walls 48 that define a U-shaped cooling jacket or chamber 49 along the side walls and bottom wall of the container 26. A suitable cooling liquid, such as water, is introduced through an inlet pipe 50 which communicates with an inlet manifold 51 to distribute the coolant evenly along the side wall. The coolant is exhausted through an outlet manifold 52 which, in turn, communicates with a coolant outlet pipe 53 which extends from the container 26 to the side wall of the housing 22, as is shown in FIGURE 2. The inlet and outlet pipes 50 and 53 are releasably connected to inlet and outlet ports 54 and 55 located in the side wall of the housing 22. The chamber 49, in combination with the condensing tank 39, serves to cool the coating liquid and prevent deleterious vaporization thereof.

A baffle plate 56 is attached to and extends between the support plates 31. The baffle plate 56 forms a seal between the top wall of the housing 22 and an upwardly extending projection of a side wall of the container 26 and between the support plates 31.

Any vapor that may form in the housing 22 is maintained at a safe level by a novel exhaust system. To this end, an exhaust outlet 57 is provided at the lower end portion of a side wall of the housing 22 and an air inlet 58 is provided in the opposite side wall of the housing 22. The inlet 58 may be provided with a suitable air filter (not shown). Air is drawn in through the air inlet 58 and air and vapor are exhausted from the outlet 57 by a suitable suction fan (not shown). The velocity of the air current passing from the inlet 58 to the outlet 57 is sufficient to create a negative pressure in the lower end of the housing 22. This negative pressure causes air to enter the housing through web inlet and outlet slots 35 and 36, respectively, and thereby prevents the escape of vapor from those ports.

As was previously explained, the action of the rapidly traveling web causes a relatively high degree of turbulence at the surface of the liquid as it leaves the container 26. The turbulent surface area presents a greater surface area to the surrounding atmosphere and thereby vaporizes more rapidly than a smooth surface. The condensing tank 39 and a water-cooled side wall not only limit the amount of surface area of the liquid at the point where the web leaves the liquid and cools the liquid bath itself, but also condense much of the vapor that does form in the region of web exit.

The vapors formed in this region are confined by the baffle plate 56 and the support plates 31, and a portion of these vapors are swept over the condensing tank by the atmospheric air drawn in through the web outlet slot 36 and condense thereon. The baffle arrangement, discussed previously, forces the air that is drawn in through the port 35 to follow a path over the tank 39 as is indicated generally by the arrows in FIGURE 3. This air flow permits a vapor blanket to remain on the surface of the bath and the vapor blanket serves to inhibit further vaporization.

If it is necessary to clean the container 26 or thread a new web around rolls 33 and 34, the container 26 may be easily removed from the housing 22. The drain tube 45 is released from the outlet port 46 and the coolant inlet and outlet pipes 50 and 53, respectively, are released from inlet and outlet ports 54 and 55 to free the container 26 from the housing 22. The jacks 23 are actuated by an air motor 59 and are driven in unison by a suitable power linkage (not shown) to extend the rams 24 from their normally retracted positions and to thereby lower the container 26. The bottom of the container is provided with four casters 60 which are in vertical alignment with a pair of channel tracks 61. When the casters 60 engage the channel tracks 61, the rams 24 are released from the hooks 25 by pulling the container 26 forward a few inches. The rams 24 are then raised to clear the top of the container 26 and the container is withdrawn through a door 62 in one end of the housing. This procedure is merely reversed when the container is reinserted into the housing.

The above discussion of the invention should make it apparent that the invention may be embodied in many different specific strip processing production lines. The disclosure of the invention will suggest to the art many possibilities for specific installations which are especially designed to meet particular conditions and operating requirements. The scope of the invention is therefore not to be limited to details of the embodiment disclosed above but is to be defined by the claims set forth below.

What is claimed is:

1. Apparatus for coating a traveling web with a vaporific liquid, which comprises a substantially closed housing, a container mounted within said housing and adapted to contain a coating liquid up to a predetermined level, means for guiding a continuous web through the liquid, cooling means mounted on said housing and extending into said container below said predetermined level to reduce, confine, and cool the surface area of said liquid in at least the region of the surface where the web leaves the liquid, means to draw air into the housing at a point adjacent said region, and means to direct said air across the surface of said liquid, whereby the surface turbulence and vaporization of the liquid are reduced.

2. Apparatus for coating a traveling web with a vaporific liquid, which comprises a substantially closed housing, a container suspended within said housing and adapted to contain a coating liquid up to a predetermined level, means for guiding a continuous web through the liquid, means suspended from the top wall of said housing and extending into said container below said predetermined level to reduce and confine the surface area of said liquid in at least the region of the surface where the web leaves the liquid, means to cool the confined surface area of the liquid, baffle means fixedly secured to the top wall of said housing and extending to and abutting a first side wall of said container, means defining a web inlet slot in said housing substantially above a second side wall of said container, means defining a web outlet slot in said housing substantially above said first side wall of said container, and an exhaust outlet in the bottom of said housing, whereby air will be drawn into the housing through said web outlet slot, across the surface of the liquid, and across a surface of said suspended means to said second side wall of said container.

3. Apparatus for coating a traveling web with a vaporific liquid, which comprises a substantially closed housing, a container within said housing and adapted to contain a coating liquid up to a predetermined level, means for guiding a continuous web through said coating liquid, means extending into said container below said predetermined level to reduce and confine the surface of said liquid in at least the region of the surface where the web leaves the liquid, means to draw air into the housing at a point adjacent said region, and means to direct said air across the surface of said liquid, whereby the surface turbulence and vaporization of the liquid are reduced.

4. Apparatus for coating a traveling web with a vaporific liquid, which comprises a substantially closed housing, a container adapted to contain a coating liquid up to a predetermined level, means suspending said container within said housing, means for guiding a continuous web out of said coating liquid and defining a web exit path at a region of said liquid adjacent a first side wall of said container, means for guiding said web into said liquid and defining a web entrance path at a region of said liquid adjacent a second side wall of said container, means suspended from the top wall of said housing between said entrance and exit paths and extending into said container below said predetermined level to reduce and confine the surface area of said liquid in at least the region of the surface where the web leaves the liquid, means to cool the confined surface area of the liquid, baffle means fixedly secured to the top wall of said housing and extending to and abutting said first side wall, means defining a web inlet slot in said housing, means defining a web outlet slot in said housing, and an exhaust outlet in the bottom of said housing, whereby air will be drawn into the housing through said web outlet slot, across the surface of the liquid, and across a surface of said suspended means to said second side wall of said container.

5. Apparatus for coating a traveling web with a vaporific liquid, which comprises a substantially closed housing, a container adapted to contain a coating liquid up to a predetermined constant level, means to maintain said constant level, means suspending said container within said housing, means for guiding a continuous web out of said coating liquid and defining a web exit path at a region of said liquid adjacent a first side wall of said container, means for guiding said web into said liquid and defining a web entrance path at a region of said liquid adjacent a second side wall of said container, a pair of support plates fixedly secured to the top wall of said housing and extending into said container below said predetermined level and adjacent each end wall of said container, a hollow water-cooled condensing tank fixedly secured at either end to said support plates and extending below said predetermined level between said entrance and exit paths to reduce, confine, and cool the surface of said liquid in at least the region of the surface where the web leaves the liquid, means to draw air into the housing at a point adjacent said region, and means to direct said air across the surface of said liquid, whereby the surface turbulence and vaporization of the liquid are reduced.

6. Apparatus for coating a traveling web with a vaporific liquid, which comprises a substantially closed housing, a container adapted to contain a coating liquid up to a predetermined constant level, means to maintain said constant level, a pair of jacks extending through said housing and suspending said container within said housing, means for guiding a continuous web out of said coating liquid and defining a web exit path at a region of said liquid adjacent a first side wall of said container, means for guiding said web into said liquid and defining a web entrance path at a region of said liquid adjacent a second side wall of said container, a pair of support plates fixedly secured to the top wall of said housing and extending into said container below said predetermined level and adjacent each end wall of said container, a hollow water-cooled condensing tank fixedly secured at either end to said support plates and extending below said predetermined level between said entrance and exit paths to reduce, confine, and cool the surface of said liquid in at least the region of the surface where the web leaves the liquid, means to cool said first and second side walls, baffle means fixedly secured to the top wall of said housing between said support plates and extending to and abutting said first side wall, means defining a web inlet slot in said housing, means defining a web outlet slot in said housing, and an exhaust outlet in the bottom of said housing, whereby air will be drawn into the housing through said web outlet slot and across the surface of the liquid to said second side wall of said container.

References Cited by the Examiner

UNITED STATES PATENTS

| | | | |
|---|---|---|---|
| 1,294,765 | 2/1919 | Burdick et al. | 118—120 |
| 2,024,248 | 12/1935 | Rafton | 118—61 |
| 2,101,138 | 12/1937 | Fuelnegg et al. | 118—419 |
| 2,742,017 | 4/1956 | Kennedy | 118—429 |
| 2,862,839 | 12/1958 | McHenry | 134—104 |
| 3,105,776 | 10/1963 | Weyhmueller | 118—429 |

FOREIGN PATENTS

| | | |
|---|---|---|
| 470,713 | 4/1952 | Italy. |
| 87,314 | 9/1936 | Sweden. |

MORRIS KAPLAN, *Primary Examiner.*

RICHARD D. NEVIUS, *Examiner.*